(12) United States Patent
Rudoff et al.

(10) Patent No.: US 11,580,029 B2
(45) Date of Patent: *Feb. 14, 2023

(54) MEMORY SYSTEM, COMPUTING SYSTEM, AND METHODS THEREOF FOR CACHE INVALIDATION WITH DUMMY ADDRESS SPACE

(71) Applicant: Intel Corporation, Santa Clara, CA (US)

(72) Inventors: Andy Rudoff, Boulder, CO (US); Tiffany J. Kasanicky, Longmont, CO (US); Wei P. Chen, Portland, OR (US); Rajat Agarwal, Portland, OR (US); Chet R. Douglas, Tuscon, AZ (US)

(73) Assignee: Intel Corporation, Santa Clara, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/223,113

(22) Filed: Apr. 6, 2021

(65) Prior Publication Data

US 2021/0263855 A1 Aug. 26, 2021

Related U.S. Application Data

(63) Continuation of application No. 16/451,086, filed on Jun. 25, 2019, now Pat. No. 10,997,082.

(51) Int. Cl.
*G06F 12/08* (2016.01)
*G06F 12/0891* (2016.01)
*G06F 12/02* (2006.01)

(52) U.S. Cl.
CPC ........ *G06F 12/0891* (2013.01); *G06F 12/023* (2013.01)

(58) Field of Classification Search
None
See application file for complete search history.

(56) References Cited

U.S. PATENT DOCUMENTS 5,809,531 A * 9/1998 Brabandt .............. G06F 9/4403
713/1

* cited by examiner

*Primary Examiner* — Kevin Verbrugge
(74) *Attorney, Agent, or Firm* — Viering, Jentschura & Partner mbB (57) ABSTRACT

A memory management system includes a cache invalidation logic configured to invalidate, based a cache invalidation event, cache entries within a cache memory by having each cache entry, of the cache entries within the cache memory, reference a respective dummy address from among dummy addresses within a dummy address space, wherein the cache memory is assigned to a memory, the memory has a memory address space associated therewith to provide access the memory, and each dummy address of the dummy addresses within the dummy address space is distinct from any address of the memory address space.

20 Claims, 5 Drawing Sheets

MEMORY SYSTEM, COMPUTING SYSTEM, AND METHODS THEREOF FOR CACHE INVALIDATION WITH DUMMY ADDRESS SPACE

CROSS-REFERENCE TO RELATED APPLICATION

This patent application is a continuation of and claims the benefit of priority to U.S. patent application Ser. No. 16/451,086, which was filed on Jun. 25, 2019 (now published as U.S. Pat. No. 10,997,082 B2), the entire content of which is hereby incorporated herein by reference.

TECHNICAL FIELD

Various aspects relate generally to a memory system, a computing system, and methods thereof, e.g., a method for operating a memory system and/or a method for operating a computing system.

BACKGROUND

Efficient memory management techniques may become more and more important as performance and data rates increase in computing architectures. In some applications, one or more caching schemes, also referred to as caching rules, caching algorithms, or caching policies, may be implemented in a computing system to increase I/O performance of one or more computer memories included in the computing system. In some cases, a computing system may include a memory management policy that allows, for example, storing and retrieving data from a secondary storage device (e.g., from a hard disk drive (HDD), from a solid-state drive (SSD), from a remote storage, as examples) for use in a main memory of the computing system. The main memory of a computing system may include, for example, one or more random access memory (RAM) modules. Modifications of a memory management policy may include caching data of a lower memory tier into a (usually smaller) memory of a higher memory tier. A memory tier may be also referred to as a memory level, wherein a lower memory level may indicate better performance with respect to, for example, bandwidth, latency, and the like.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa. Throughout the drawings, it should be noted that like reference numbers are used to depict the same or similar elements, features, and structures.

Various aspects are related to a hierarchical memory architecture including at least two distinct memory tiers. In general, a hierarchical memory architecture may be used in a computing system to provide data to one or more processors (e.g., to one or more central processing units (CPUs), to a system on chip (Soc) including one or more processors, among others). In some aspects, a memory address space may be provided to address the memory of the computing system. Further, a caching scheme may be used to cache blocks of a memory in a cache memory associated with the memory. Applications executed by an operating system of the computing system may benefit from increased performance, for example, due to the caching of a part of the data of a memory. The performance increase may depend on the higher cache memory performance compared to the memory associated with the cache memory (e.g., the cache memory may have a lower latency and/or a higher bandwidth for I/O operations than the underlying memory) and the cache hit/miss rate for I/O request. The cache hit/miss ratio may be influenced by one or more cache policies (e.g., by one or more prefetching policies and/or one or more cache replacement policies). The cache hit/miss ratio may be influenced by the memory size of the cache memory. As an example, cache hits may be more likely in the case the ratio of the size of the cache memory and the size of the memory from which the data are cached is higher. It is understood that the size of the cache memory is smaller than the size of the memory associated therewith.

According to some aspects, a computing system or a memory system may include one or more implemented cache coherence schemes. As an example, the one or more cache coherence schemes may be implemented to ensure cache coherence in the case that, for example, more than one processor has access to a cached memory system and/or in the case of a power failure and the like.

According to some aspects, a computing system or a memory system may include one or more memory modules providing a memory and one or more memory modules providing a cache for the memory. The cache may be referred to as near memory or near memory cache and the memory associated with the cache may be referred to as far memory. According to various aspects, the memory and the cache may represent different memory levels, wherein the cache (illustratively the near memory) may have a higher performance than the memory (illustratively the far memory) associated with the cache. According to various aspects, the memory and the cache may be sub memory levels in the same major storage level, for example, in the main memory level (e.g., including the system RAM). The main memory level may be next to the internal memory level (e.g., including CPU registers and CPU caches).

According to various aspects, one or more persistent memory modules (PMM) may be used to provide the far memory. The far memory may be supported by the near memory acting as a cache for the far memory. As an example, the near memory may be configured to cache data to be written into or read from the far memory. As an example, dynamic random access memory (DRAM) may be used as the near memory. The near memory may be a write-back memory side cache in front of the larger capacity far memory. This configuration may be also referred to as two-level memory (2LM). Hardware and/or software may be configured to ensure that any persistent data cached in the near memory is flushed out to the far memory in the event of a power failure. Further, there may be situations where hardware and/or software may need to guarantee that the persistent data is flushed to the far memory at runtime (e.g., upon a flush request). Furthermore, some situations may require not only a memory side cache flush, but also a cache invalidate as well (e.g., upon a flush/invalidate request). For example, cached persistent data may be flushed before a cryptographic erase is carried out and invalidated after the cryptographic erase. With DRAM capacities increasing, efficient cache sizes may be comparatively large (e.g., more than 1 gigabyte, GB), and it may take minutes if not hours to flush and invalidate the cache using conventional approaches. According to various aspects, logic is provided to reduce the time it may take to flush and invalidate the near memory to the far memory at runtime. The logic may be implemented in software and/or in hardware.

In general, a read operation that includes reading the size of the far memory may ensure that all dirty data in the near memory is evicted to the far memory. However, the ratio between far memory and near memory may be greater than one (e.g., 2:1 or higher than 2:1, e.g., up to 10:1 or up to more than 10:1). Therefore, to flush dirty lines out of the near memory, software and/or hardware may loop over each cache line (the cache line may have a size of 64-bytes, for example) for a range that is twice the size or more than twice (e.g., up to 10 times or more than 10 times the size) of the near memory. As a result, multiple terabytes of flushing may occur, as capacities may get larger and the corresponding memory side caches may get larger as well. Depending on the size of the near memory, this may take minutes or even hours by this general approach. Some situations may require the near memory to be flushed and then invalidated, but there may be no invalidation operation available (e.g., based on setting an invalid bit). In this case, a software and/or a hardware may be used with a strategy where it may read 4 times or more than 4 times (e.g., 40 times or more than 40 times) the size of the near memory, e.g., 2 times or more than 2 times (e.g., 20 times or more than 20 times) for flushing dirty lines and 2 times or more than 2 times (e.g., 20 times or more than 20 times) for evicting the data from the near memory. This may increase delay considerably for a persistent memory ecosystem.

Various aspects are related to a computing system and a memory system and methods for an operation thereof. According to various aspects, a dummy address space may be created and used to flush one or more (e.g., all) dirty cache lines of a cache (e.g., of a memory side cache) into a corresponding memory (e.g., into a memory associated with the cache) and/or to invalidate one or more (e.g., all) cache entries of the cache. A cache may be also referred to as cache memory. The memory (illustratively the far memory) may be a main memory of a computing system or of a memory system. According to various aspects, the memory system may be a subsystem of a computing system. In other words, a computing system may include a memory system and one or more CPUs configured to access the memory of the memory system.

According to various aspects, a non-allocated (illustratively empty or unused) physical address space may be utilized as a dummy address space. In some aspects, no physical memory may be associated with the dummy address space. Alternatively, a physical dummy memory may be associated with the dummy address space.

According to various aspects, the dummy address space may be created with the same size as the cache memory. In the case that the cache engine or any other logic (e.g., implemented in software and/or hardware) reads cache lines from the dummy address space, only one pass may be required (e.g., one time the size of the cache memory) to achieve both flushing dirty data from the cache (since, for example, no cache hit may be generated in the cache memory and, therefore, all cache entries in the cache memory may be evicted) and invalidating the cache entries (since, for example, dummy cache entries are stored in the cache memory that causes the evictions). The dummy cache entries may reference (e.g., point) into the dummy address space. In some aspects, the cache entries may have tags associated with the cache lines, wherein the tags represent a memory address to correlate the cache line with a corresponding block of the memory from which the data are cached. According to various aspects, the tag of a dummy cache entry may represent a dummy address of the dummy address space. Therefore, in the case that the cache memory is filled with dummy cache entries, the tags will not match any memory address associated with the memory address space of the memory. In some aspects, the dummy cache entries may have tags that do not match any physical memory addresses in use by an operating system of the computing system.

According to various aspects, it may be assured by a cache flush/invalidate logic, that each cache line of the cache memory is both evicted (e.g., flushed) and invalidated with a single read-operation. The single read-operation may include reading from the dummy address space or reading the dummy address space. Therefore, the cache memory (e.g., the memory side cache) may be flushed and invalidated efficiently.

According to various aspects, the dummy address space may be provided (e.g., created) by a firmware (FW) of a computing system or of a memory system, for example, by a UEFI-(Unified Extensible Firmware Interface) firmware. The firmware may create a dummy address space of the size of the cache memory in the system physical address space. The firmware may also provide as an interface for software to flush and invalidate the cache memory. When the interface is called, the firmware may cause a read of the dummy address space, which may fill the cache memory up with invalid data and flush out any dirty lines from the cache memory.

Figure 1:
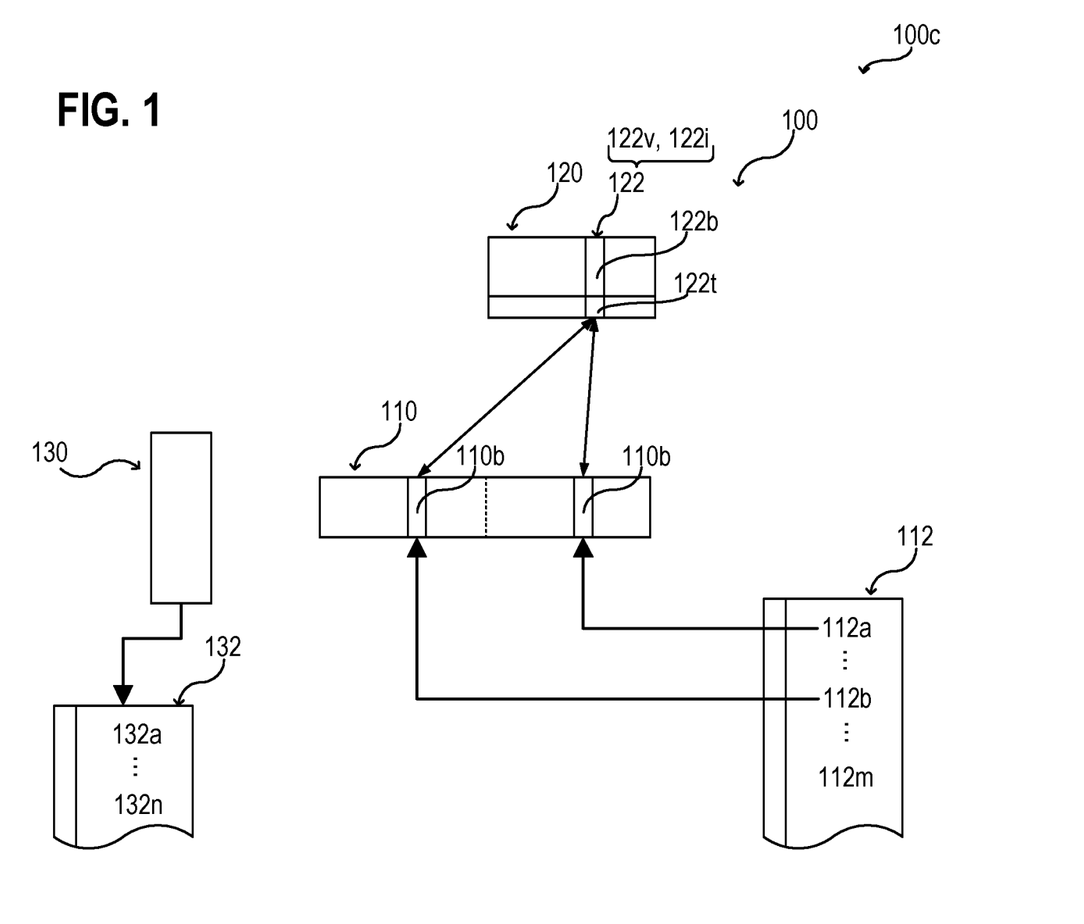
FIG. 1 shows a schematic view of a memory system including a memory and a cache memory associated therewith, according to various aspects.

FIG. 1 illustrates a memory system 100, according to various aspects. The memory system 100 may be part of a computing system 100c or any other electronic device or electronic component. The memory system 100 may include a memory 110 and a cache memory 120 assigned to the memory 110. The cache memory 120 may have a lower memory level than the memory 110 to increase performance of the memory 110 by caching a subset of the memory 110. In the case that a read operation to read data from the memory 110 and/or a write operation to write data in the memory 110 is instructed by a processor (e.g., by a CPU, a memory controller, or other device(s) having access to the memory 110) it may be determined whether the data is already stored in the cache memory 120. If this is the case, the data will be read from or written into the cache memory 120. In the case that the data are written into the cache memory 120, a cache flush operation may be carried out (e.g., before a shutdown of the memory system 100, or e.g., at predefined times during operation of the memory system 100) to ensure cache coherence. In the case that it is determined that the data are not stored in the cache memory 120, the respective data may be fetched from the memory 110 (e.g., copied from the memory 110 into the cache memory 120).

The memory 110 may have a memory address space 112 associated therewith. An operating system (or any other software, e.g., a firmware) or a hardware may access the memory 110 based on the memory address space 112. An access to the memory 110 may include, for example, reading data (e.g., in blocks) from the memory 110 and storing data (e.g., in blocks) in the memory 110. An access to the memory 110 may further include an erase operation to erase data stored in the memory 110. In some aspects, an erase operation may include a cryptographic erase.

According to various aspects, a predefined block size may be used to transfer data in blocks between the memory 110 and the cache memory 120. Therefore, memory blocks 110b of the memory 110 may have the same block size as cache blocks 122b of the cache memory 120. A block of a cache memory may be referred to as a cache block or as a cache line. A memory block and/or a cache line may include one or more words. A cache entry 122 in the cache memory 120 may include the respective cached data (e.g., memory block 110b of the memory 110) and a tag 122t. The tag 122t of a cache entry may represent the location (e.g., the memory address) in the memory 110 corresponding to the data (e.g., the cached block 110b of the memory 110) of the cache entry.

According to various aspects, the memory system 100 may further include one or more processors 130. The one or more processors 130 may be configured to generate a dummy address space 132. The dummy address space 132 may be used in addition to the memory address space 112 for one or more specific operations. Each address of the dummy address space 132 may be distinct from any address of the memory address space 112. As an example, none of the addresses of the dummy address space 132 may be associated with data allocated in the memory 110. According to one aspect, however, a portion of the dummy address space 132 may be associated with a portion of the data allocated in memory 110. As another example, none of the addresses of the dummy address space 132 may be associated with any physical memory of the memory system 100.

According to various aspects, a cache entry 122 of the cache memory 120 may be referred to herein as valid or as a valid cache entry 122v in the case that the cache entry 122 (e.g., via the tag 122t) references the memory address space 112 of the memory 110. According to various aspects, the one or more processors 130 may be configured to generate one or more invalid cache entries 122i in the cache memory 120. In some aspects, the one or more processors 130 may be configured to fill the cache memory 120 completely with invalid cache entries 122i. A cache entry 122 of the cache memory 120 may be referred to herein as invalid or as an invalid cache entry 122i in the case that the cache entry 122 (e.g., via the tag 122t) references into the dummy address space 132.

In some aspects, the generation of the one or more invalid cache entries 122i may include a read operation that may be directed to one or more (e.g., to all) addresses 132a, . . . , 132n of the dummy address space 132. A read operation directed to the dummy address space 132 may be referred to herein as a dummy read operation, since no actual data may be read from a physical memory.

According to various aspects, the one or more processors 130 may be configured to operate the memory 110 and the cache memory 120 in accordance with one or more caching schemes. A caching scheme may provide a variety of possible implementations. As an example, the one or more processors 130 may be configured to operate the cache memory 120 in a direct mapping mode. In other words, the blocks of the memory 110 may be directly mapped to the cache lines of the cache memory 120. In this case, the cache memory 120 is referred to as a direct mapped cache.

According to various aspects, the memory 110 of the memory system 100 may be a main memory of a computing system. In this case, the cache memory 120 may be referred to as memory side cache since it is logically closer to the main memory than to one or more CPUs of the computing system. However, the aspects described herein may be applied to any other suitable memory hierarchy that is based on caching in an at least two-level memory environment. According to various aspects, the aspects described herein may be applied to any caching scheme that has, for example, no valid/invalid bit to indicate invalid cache entries and/or to any caching scheme that has no option to consider a valid/invalid bit. According to various aspects, the tag of the cache entries may be used for both, referencing memory addresses of the memory 110 in the case that the cache entry is valid and referencing a dummy address that does not reference to a memory address of the memory 110 in the case that the cache entry is invalid.

According to various aspects, the one or more processors 130 may be further configured to cause an eviction (e.g., a flush) of the cache memory 120 in the case that the dummy read operation is carried out. Reading from the dummy address space 132 may cause, for example, a cache miss for each valid cache entry 122v of the cache memory 120 since the addresses 132a, . . . , 132n of the dummy address space 132 are, for example, distinct from the addresses 112a, . . . , 112m of the memory address space 112. Therefore, according to various aspects, all valid cache entries 122v may be evicted from the cache memory 120 (e.g., replaced by invalid cache entries 122i) by reading the dummy address space 132. The one or more processors 130 may be configured to carry out a cache coherence scheme, e.g., dirty cache lines may be flushed out of the cache memory 120 (e.g., to the memory 110) before being replaced. Therefore, before a valid cache entry 122v is replaced by an invalid cache entry (e.g., due to the dummy read operation), any dirty cache line may be flushed out to the memory 110. As a result, the one or more processors 130 may be configured such that reading the dummy address space 132 may cause a cache flush and a cache invalidation. In some aspects, the size of the dummy address space 132 has the same size as the cache memory 120 such that a read of the complete dummy address space 132 may cause a complete cache flush and a complete cache invalidation of the cache memory 120.

The cache invalidation, as described herein, may be understood, for example, as filling the cache memory 120 with useless (e.g., garbage) cache entries 122i since the dummy read operation is directed to the dummy address space 132 that may be not accessible by any application executed by an operating system of a computing system communicatively coupled to the memory system 100. Therefore, after the cache memory 120 is invalidated by reading from the dummy address space 132, no cache hit may occur if an application accesses the memory 110 via the memory addresses 112a, 112b, 112m of the memory address space 112.

According to various aspects, the one or more processors 130 may be configured to change (e.g., set) a bit-value of a dirty bit associated with each cache entry 122 of the cache memory that is modified by a write-back operation. This allows for a cache flush of modified cache entries 122 only. As an example, the one or more processors 130 may be further configured to flush each (e.g., valid and modified) cache entry 122 of the cache memory 120 to the memory considering the bit-value of the dirty bit in response to a dummy read operation directed to each address of the dummy address space. Since the dummy address space 132 may be, for example, not accessible by any application executed by an operating system of a computing system accessing the memory system 100, invalid cache entries 122i may not be modified and may not be considered during a flush of the cache memory 120. In the case that no dirty bit may be associated with the respective cache entries 122, all cache lines 122b may be flushed out to the memory 110.

According to various aspects, the one or more processors 130 may be configured to implement caching logic (also referred to caching algorithm or a caching scheme) and a cache flush/invalidate logic. The cache flush/invalidate logic may be provided as firmware with a firmware interface that can be called by an application or by the operating system.

Figure 2:
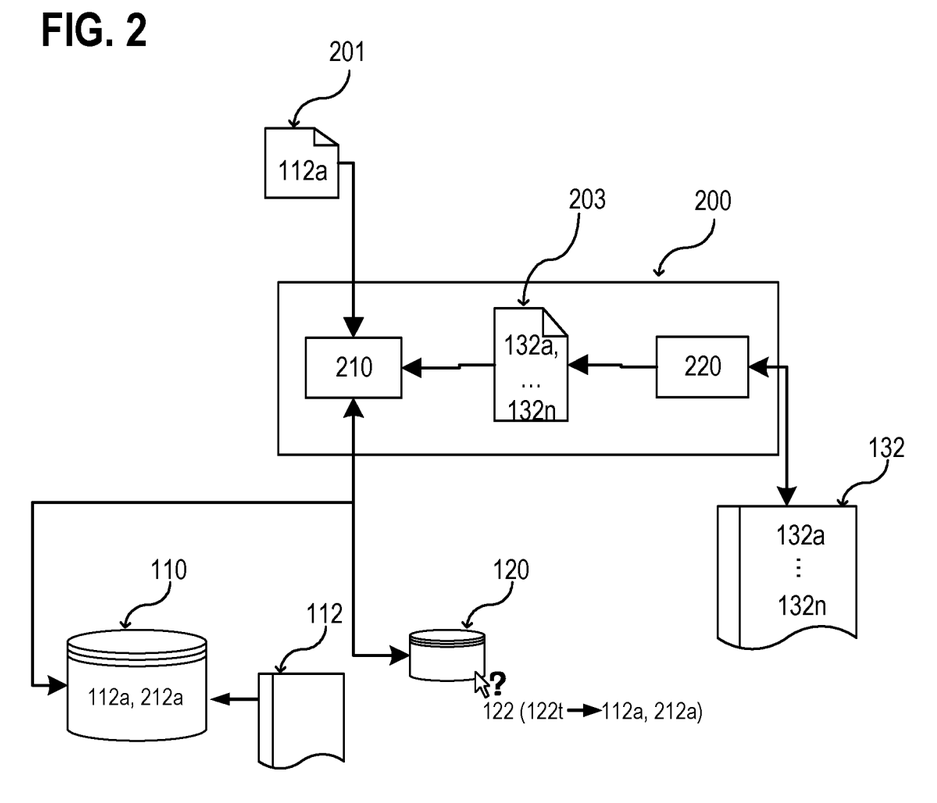
FIG. 2 shows a schematic view of a memory system including a caching logic and a cache flush and/or cache invalidate logic associated therewith, according to various aspects.

FIG. 2 shows a memory system 200 in a schematic view, according to various aspects. The memory system 200 may be part of a computing system or any other electronic device or electronic component. The memory system 200 may include a caching logic 210 and a cache flush/invalidate logic 220, according to various aspects. The caching logic 210 and/or the cache flush/invalidate logic 220 may be implemented in hardware, software, or as a hybrid including hardware and software.

According to various aspects, the caching logic 210 of the memory system 200 may be configured to receive a read instruction 201 (e.g., from an application) to read data from a memory address 112a. The memory address 112a may be from a memory address space 112 associated with a memory 110. The memory 110 may have a cache memory 120 associated therewith. The caching logic 210 may be further configured to determine whether or not data 212a corresponding to the memory address 112a are stored in the cache memory 120 or not. The determination whether or not the data 212a corresponding to the memory address 112a are stored in the cache memory 120 may include checking whether one cache entry 122 of the cache memory 120 has a tag 122t that references the memory address 112a. In the case that it is determined that the requested data 212a are stored in the cache memory 120, the caching logic 210 may read the data 212a from the cache memory 120. Furthermore, in the case that the data 212a are not stored in the cache memory 120, the data 212a may be fetched from the memory 110 (e.g., read from the memory 110 and stored in the cache memory 120). In the case that a dirty cache line is replaced by fetching the data 212a, the dirty cache line may be flushed out to the memory 110 first.

According to various aspects, the cache flush/invalidate logic 220 of the memory system 200 may be configured to generate a dummy address space 132. The dummy address space 132 may be generated in such a way that the dummy addresses 132a, . . . , 132n of the dummy address space 132 cover (in other words address) a memory size that is equal to a memory size of the cache memory 120. The cache flush/invalidate logic 220 may be further configured to provide a dummy read instruction 203 to the cache logic 210 to cause a read from each address 132a, . . . , 132n of the dummy address space 132. In response to the reception of the dummy read operation 203, the caching logic generates invalid cache entries in the cache memory 120, the invalid cache entries referencing dummy addresses 132a, . . . , 132n of the dummy address space 132.

Various aspects may be related to a method for operating a memory system 200 (e.g., a multi-level memory system, and/or a memory system 100). However, any other suitable computing system or memory system may be operated in the same or in a similar way.

Figure 3:
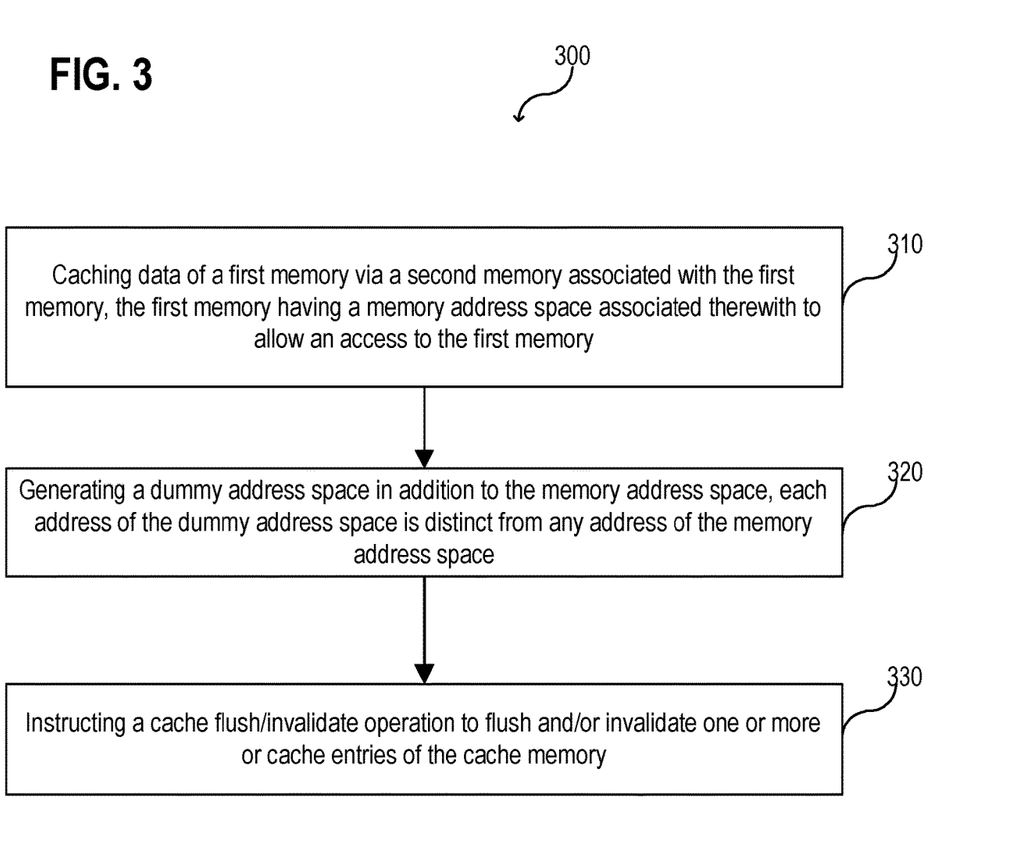
FIG. 3 shows a schematic flow diagram of a method for operating a memory system, according to various aspects.

FIG. 3 shows a schematic flow diagram of a method 300 for operating a memory system (e.g., a multi-level memory system) or a computing system, according to various aspects. The method 300 may include, in 310, caching data of a first memory via a second memory associated with the first memory, the first memory having a memory address space associated therewith to allow an access (e.g., by an operating system or an application executed by the operating system) to the first memory. The method 300 may further include, in 320, generating a dummy address space in addition to the memory address space, each address of the dummy address space being distinct from any address of the memory address space. The method 300 may further include, in 330, instructing a cache flush/invalidate operation to flush and/or invalidate one or more or all cache entries of the cache memory.

According to various aspects, the invalidate cache operation may include filling the cache memory with invalid cache entries by reading from the dummy address space, each of the invalid cache entries referencing a dummy address of the dummy address space. According to various aspects, the flush and invalidate cache operation may include flushing dirty cache lines out of the cache memory and filling the cache memory with invalid cache entries by reading from the dummy address space, each of the invalid cache entries referencing a dummy address of the dummy address space.

In the following, various details and/or modifications are described that may refer to the memory system 100, the memory system 200, and/or the method 300, as described above. According to various aspects, the dummy address space 132 may be associated with a memory size that is at least equal to a memory size of the cache memory.

Figure 4A:
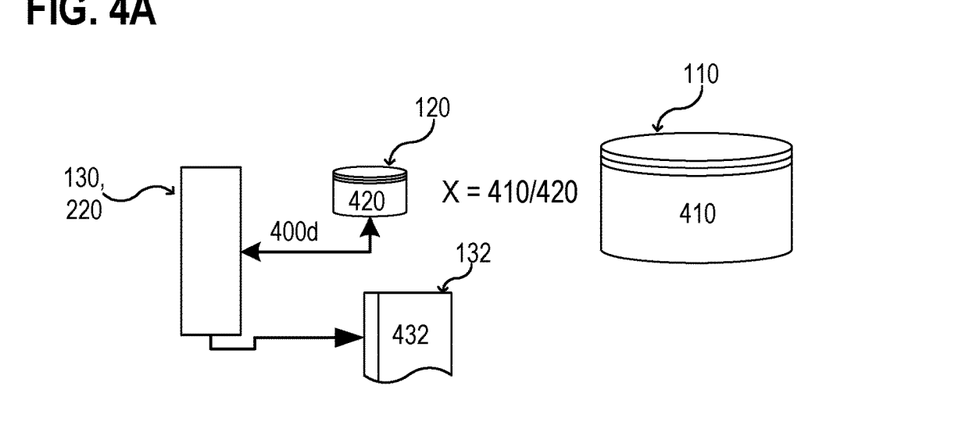
FIG. 4A and FIG. 4B show various functions of a computing system and/or a memory system in a schematic view, according to various aspects.

According to various aspects, the one or more processors 130 of the memory system 100 or the cache flush/invalidate logic 220 of the memory system 200 may be configured to determine 400d the memory size 420 of the cache memory 120, as shown in a schematic view in FIG. 4A, for example. The memory size 420 of the cache memory 120 may be 1 GB or an integer multiple of 1 GB. The memory size 420 of the cache memory 120 may be, for example, 16 GB or more than 16 GB, e.g., 64 GB or more than 64 GB, e.g., 128 GB or more than 128 GB, e.g., 256 GB or more than 256 GB, e.g., 512 GB or more than 512 GB, e.g., 1024 GB (1 TB) or more than 1 TB, e.g., 2 TB or more than 2 TB, e.g., 3 TB or more than 3 TB. The one or more processors 130 of the memory system 100 or the cache flush/invalidate logic 220 of the memory system 200 may be further configured to generate the dummy address space 132 with a memory size 432 that matches the determined memory size 420 of the cache memory 120. As an example, the memory size 432 covered by dummy address space 132 may be greater than or equal to the memory size 420 of the cache memory 120. According to various aspects, a number, n, of dummy addresses of the dummy address space 132 may be at least the number of cache entries 122 in the cache memory 120 to fill the cache memory 120 completely with invalid cache entries 122i.

According to various aspects, a memory size 410 of the memory 110 may be greater than the memory size 420 of the cache memory 120. As an example, the memory size 410 of the memory 110 may be an integer multiple of a memory size 420 of the cache memory 120. A ratio, X, of the memory size 410 of the memory 110 and the memory size 420 of the cache memory 120 may be 2:1 or more than 2:1, e.g., 3:1 or more than 3:1, e.g., 4:1 or more than 4:1, e.g., 5:1 or more than 5:1, e.g., 6:1 or more than 6:1, e.g., 7:1 or more than 7:1, e.g., 8:1 or more than 8:1, e.g., 9:1 or more than 9:1, e.g., 10:1 or more than 10:1. A ratio, X, of the memory size 410 of the memory 110 and the memory size 420 of the cache memory 120 may be less than 20:1. According to various aspects, the time that may be needed to invalidate (or to flush and invalidate) the cache memory 120 may be independent of the ratio X, since the dummy read operation may include reading the dummy addresses of the dummy address space 132 only one time to thereby cause the cache flush and/or the cache invalidate.

According to various aspects, the cache memory 120 of the memory system 100 or of the memory system 200 may be a direct mapped cache memory.

Figure 4B:
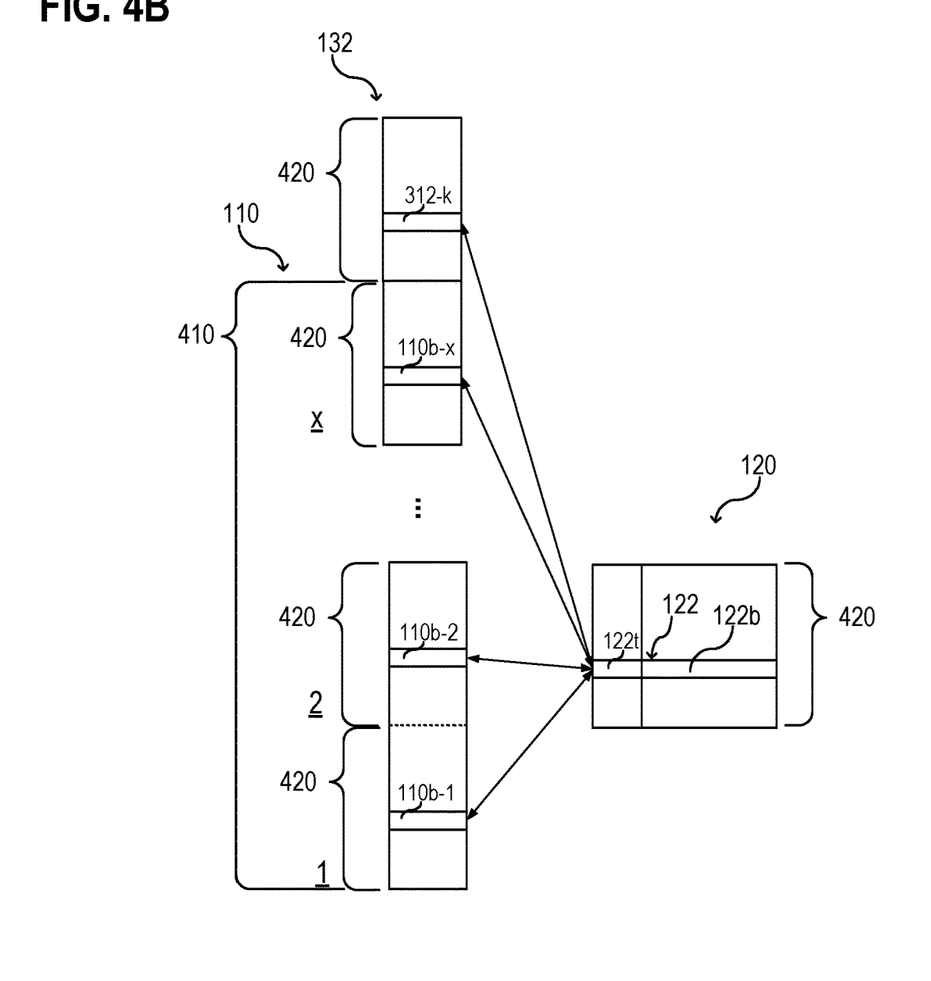

FIG. 4B shows a direct mapping of the cache memory 120 to the memory 110, according to various aspects. As an example, each cache line 122b of the direct mapped cache memory 120 may be assigned to a number of x (x is an integer greater than 1) blocks 110b of the corresponding memory 110. The number x may be defined by the ratio X of the memory size 410 of the memory 110 and the memory size 420 of the cache memory 120. In this case, the tag 122t that is assigned to a respective cache line 122b may represent a number from 1 to x and thereby may provide a direct correlation between the cache line 122b of the cache entry 122 and the corresponding block 110b in the memory 110.

According to various aspects, the dummy address space 132 may be provided with the same size as the cache memory 120 and may be directly mapped to the cache memory 120, as illustrated, for example, in FIG. 4B. According to various aspects, each cache entry 122 of the direct mapped cache memory 120 may be assigned to a dummy address 312-k of the dummy address space 132.

A valid tag 122t of a respective cache entry 122 may reference to one of the corresponding blocks 110b-1, 110b-2, 110b-x that are assigned to a respective cache entry 122. If the tag 122t of the cache entry 122 is invalidated, the tag 122t may reference to the corresponding dummy address 312-k that is assigned to a respective cache entry 122.

According to various aspects, after reading the dummy address space 132, each cache entry 122 of the cache memory 120 includes a dummy address that is different from any other dummy address of the other cache entries. In other words, none of the invalid cache entries 122v may have the same dummy address after invalidation.

According to various aspects, the memory 110 and/or the cache memory 120 may include one or more random access memory (RAM) modules (e.g., one or more dynamic random access memory (DRAM) modules). Illustratively, the memory 110 and/or the cache memory 120 may be provided by one or more suitable memory modules. The memory 110 and the cache memory 120 may be configured as a two-level main memory of a computing system. The memory modules of the two-level main memory may be arranged on a mainboard of a computing system, for example. The computing system may include a storage server, a personal computer, a notebook, a tablet computer, a smartphone, or any other suitable electronic device or electronic system. The one or more memory modules providing the memory 110 and the cache memory 120 may be operated via the same memory channel (e.g., in a dual-channel memory architecture, in a quad-channel memory architecture, in a six-channel memory architecture, in an eight-channel memory architecture, or in any other suitable multi-channel memory architecture).

According to various aspects, the cache memory 120 may include one or more volatile random access memory modules, e.g., one or more DDR-SDRAM (double data rate synchronous dynamic random access memory) modules, e.g., one or more DDR4-SDRAM modules. According to various aspects, the memory 110 may include one or more non-volatile random access memory modules, e.g., one or more persistent memory modules (PMMs). According to various aspects, the cache memory 120 and/or the memory system 100 may be configured in such a way that, in the case that a request hits the cache memory 120, the latency for a data transfer in response to the cache hit may be less than 100 nanoseconds (ns). Since a cache miss will be directed to the memory 110, a cache miss may cause a greater latency, for example, in the range from about 150 ns to about 1000 ns.

Figure 5:
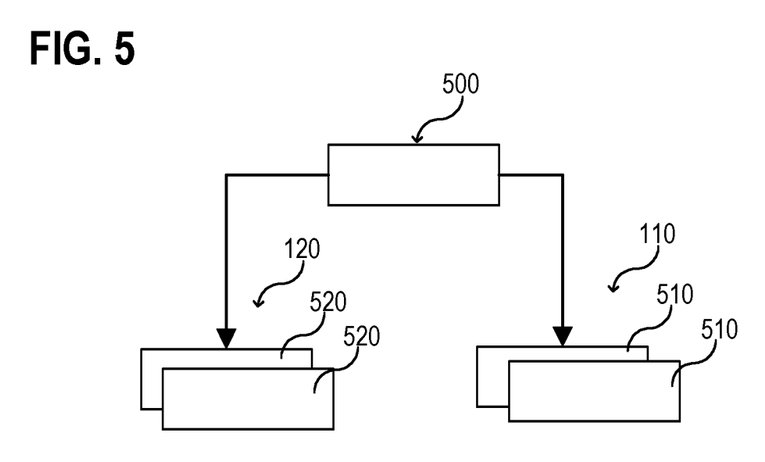
FIG. 5 shows a schematic view of a memory controller configured to control operation of a memory and a cache memory, according to various aspects.

According to various aspects, the memory 110 and the cache memory 120 may be controlled by a host memory controller 500, as illustrated in a schematic view in FIG. 5. The cache memory 120 and the memory 110 may be controlled in accordance with a DDR4 and/or a DDR4-T protocol, given that suitable memory modules 510, 520 are used (e.g., DDR4-SDRAM modules to provide the cache memory 120 and suitable PMMs to provide the memory 110).

One or more aspects may be related to a main memory of a computing system that includes, for example, at least two levels (also referred to as triers) of memory. The main memory may include a first level (also referred to as near memory) that may include smaller faster memory made of, for example, DRAM; and a second level (also referred to as far memory) which may include larger and slower (with respect to the near memory) volatile memory (e.g., DRAM) or non-volatile memory storage (e.g., phase change memory, flash memory, persistent memory, etc.). According to various aspects, the far memory (e.g., the memory 110) may be visible for a host operating system as the main memory, wherein the near memory (e.g., the cache memory 120) may be configured as a cache for the far memory that is transparent to the operating system.

According to various aspects, a persistent memory module (PMM) may include an Intel® Optane™ Data Center Persistent Memory Module (DCPMM) also referred to as Intel® Optane™ DC Persistent Memory Module (Intel and Intel Optane are trademarks of Intel Corporation or its subsidiaries in the U.S. and/or other countries).

According to various aspects, the memory 110 of the memory system 100 or of the memory system 200 may include a non-volatile memory (NVM) and, for example, at least one processor (e.g., a logic circuit) configured to encrypt and/or decrypt data stored in and/or read from the non-volatile memory via at least one cryptographic key. According to various aspects, in the case that the memory 110 has a cryptographic key associated therewith, the memory 110 may be erased by changing or deleting the cryptographic key. In some aspects, changing or deleting the cryptographic key may render the data stored in the memory 110 substantially useless (also referred to as cryptographic erase).

The phrase "at least one" and "one or more" may be used herein to include a numerical quantity greater than or equal to one (e.g., one, two, three, four, [ . . . ], etc.). The word "plurality" may be used herein to include a numerical quantity greater than or equal to two (e.g., two, three, four, five, [ . . . ], etc.).

The phrase "at least one of" with regard to a group of elements may be used herein to include at least one element from the group consisting of the elements. For example, the phrase "at least one of" with regard to a group of elements may be used herein to include a selection of: one of the listed elements, a plurality of one of the listed elements, a plurality of individual listed elements, or a plurality of a multiple of listed elements.

The word "plurality" and "multiple" in the description and the claims expressly refer to a quantity greater than one. Accordingly, any phrases explicitly invoking the aforementioned words (e.g., "a plurality of [objects]," "multiple [objects]") referring to a quantity of objects expressly refers more than one of the said objects. The terms "group (of)," "set (of)," "collection (of)," "series (of)," "sequence (of)," "grouping (of)," etc., and the like in the description and in the claims, if any, refer to a quantity equal to or greater than one, i.e. one or more.

The term "data" as used herein may be understood to include information in any suitable analog or digital form, e.g., provided as a bit, a set of bits, a byte, a set of bytes, a word, a set of words, a block, a set of blocks, a file, a portion of a file, a set of files, a signal or stream, a portion of a signal or stream, a set of signals or streams, as examples. Further, the term "data" may also be used to mean a reference to information, e.g., in form of a pointer. The term data, however, is not limited to the aforementioned examples and may take various forms and represent any information as understood in the art.

The terms "processor" or "controller" as, for example, used herein may be understood to include any kind of entity that allows handling data. The data may be handled according to one or more specific functions executed by the processor or controller. Further, a processor or controller as used herein may be understood to include any kind of circuit, e.g., any kind of analog or digital circuit. The term "handle" or "handling" as for example used herein referring to data handling, file handling or request handling may be understood to include any kind of operation, e.g., an I/O operation, and/or any kind of logic operation. An I/O operation may include, for example, storing (also referred to as writing) and reading.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions described herein may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Differences between software and hardware implemented data handling may blur. A processor, controller, and/or circuit detailed herein may be implemented in software, hardware and/or as hybrid implementation including software and hardware. In some aspects, any method described herein may be partially or completely implemented as a non-transitory computer readable medium with program instructions, which when executed, cause one or more processors to perform at least a portion or all of the method.

The term "system" (e.g., a computing system, a memory system, etc.) detailed herein may be understood to include a set of interacting elements, wherein the elements can be, by way of example and not of limitation, one or more mechanical components, one or more electrical components, one or more instructions (e.g., encoded in storage media), and/or one or more processors, and the like.

As used herein, the term "memory", "memory device", "memory module", and the like may be understood to include a non-transitory computer-readable medium in which data or information can be stored for retrieval. References to "memory" included herein may thus be understood as referring to volatile or non-volatile memory, including random access memory (RAM), flash memory, solid-state storage, magnetic tape, hard disk drive, optical drive, 3D crosspoint (3DXP), etc., or any combination thereof. Furthermore, it is appreciated that registers, shift registers, processor registers, data buffers, etc., are also embraced herein by the term memory. It is appreciated that a single component referred to as "memory" or "a memory module" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

A volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In some aspects, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Various aspects may be applied to any memory device that includes non-volatile memory. In one aspect, the memory device is a block addressable memory device, such as those based on negative-AND (NAND) logic or negative-OR (NOR) logic technologies. A memory may also include future generation non-volatile devices, such as a 3DXP memory device, or other byte addressable write-in-place non-volatile memory devices. A 3DXP memory may include a transistor-less stackable cross-point architecture in which memory cells sit at the intersection of word lines and bit lines and are individually addressable and in which bit storage is based on a change in bulk resistance.

According to various aspects, the term "volatile" and the term "non-volatile" may be used herein, for example, with reference to a memory, a memory cell, a memory device, a storage device, etc., as generally known. These terms may be used to distinguish two different classes of (e.g., computer) memories. A volatile memory may be a memory (e.g., computer memory) that retains the information stored therein only while the memory is powered on, e.g., while the memory cells of the memory are supplied via a supply voltage. In other words, information stored on a volatile memory may be lost immediately or rapidly in the case that no power is provided to the respective memory cells of the volatile memory. A non-volatile memory, in contrast, may be a memory that retains the information stored therein while powered off. In other words, data stored on a non-volatile memory may be preserved even in the case that no power is provided to the respective memory cells of the non-volatile memory. Illustratively, non-volatile memories may be used for a long-term persistent storage of information stored therein, e.g., over one or more years or more than ten years. However, non-volatile memory cells may also be programmed in such a manner that the non-volatile memory cell becomes a volatile memory cell (for example, by means of correspondingly short programming pulses or a correspondingly small energy budget introduced into the respective memory cell during programming).

In some aspects, a memory, as described herein, may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The terms memory or memory module may refer to the die itself and/or to a packaged memory product.

In the following, various examples are provided with reference to the aspects described above.

Example 1 is a memory system, including: a memory having a memory address space associated therewith to access the memory; a cache memory assigned to the memory; one or more processors configured to generate a dummy address space in addition to the memory address space, each address of the dummy address space being distinct from any address of the memory address space, and generate one or more invalid cache entries in the cache memory, the one or more invalid cache entries referencing (in other words indicating or representing) one or more dummy addresses of the dummy address space.

In Example 2, the memory system of Example 1 may optionally include that each of the one or more invalid cache entries includes a tag, the tag of the respective invalid cache entry representing a dummy address of the dummy address space.

In Example 3, the memory system of Example 1 or 2 may optionally include that the generation of the one or more invalid cache entries includes a dummy read operation directed to the one or more dummy addresses of the dummy address space.

In Example 4, the memory system of any one of Examples 1 to 3 may optionally include that the generation of the one or more invalid cache entries includes invalidating each cache entry of the cache memory by a dummy read operation directed to each dummy address of the dummy address space.

In Example 5, the memory system of any one of Examples 1 to 4 may optionally include that the one or more processors are further configured to generate one or more valid cache entries in the cache memory, the one or more valid cache entries referencing one or more memory addresses of the memory address space.

In Example 6, the memory system of Example 5 may optionally include that the generation of the one or more valid cache entries includes a read operation to read from the one or more memory addresses of the memory address space.

In Example 7, the memory system of any one of Examples 1 to 6 may optionally include that the one or more processors are further configured to change a bit-value of a dirty bit associated with each cache entry of the cache memory that is modified by a write-back operation.

In Example 8, the memory system of Example 7 may optionally include that the one or more processors are further configured to flush each modified cache entry of the cache memory to the memory depending on the bit-value of the dirty bit in response to a dummy read operation directed to each address of the dummy address space.

In Example 9, the memory system of Example 8 may optionally include that the flush of each modified cache entry includes a read operation from the cache memory and a write operation to the memory.

In Example 10, the memory system of any one of Examples 1 to 9 may optionally include that the dummy address space is associated with a memory size that is substantially equal to a memory size of the cache memory.

In Example 11, the memory system of any one of Examples 1 to 10 may optionally include that a number of dummy addresses of the dummy address space is equal to or greater than a maximum number of cache entries of the cache memory.

In Example 12, the memory system of any one of Examples 1 to 11 may optionally include that a memory size of the memory is greater than a memory size of the cache memory.

In Example 13, the memory system of any one of Examples 1 to 12 may optionally include that a latency for an input/output operation directed to the memory is greater than a latency for the input/output operation directed to the cache memory.

In Example 14, the memory system of any one of Examples 1 to 13 may optionally include that a bandwidth for an input/output operation directed to the memory is less than a bandwidth for the input/output operation directed to the cache memory.

In Example 15, the memory system of any one of Examples 1 to 14 may optionally include that a memory size of the memory is an integer multiple of a memory size of the cache memory.

In Example 16, the memory system of any one of Examples 1 to 15 may optionally include that the cache memory includes one or more random access memory modules.

In Example 17, the memory system of any one of Examples 1 to 16 may optionally include that the one or more random access memory modules include one or more volatile random access memory modules.

In Example 18, the memory system of any one of Examples 1 to 17 may optionally include that the memory includes one or more random access memory modules.

In Example 19, the memory system of Example 18 may optionally include that the one or more random access memory modules include one or more non-volatile random access memory modules.

In Example 20, the memory system of any one of Examples 1 to 19 may optionally include that the one or more processors are further configured to determine a memory size of the cache memory and to generate the dummy address space with a predefined size, the predefined size is dependent from the determined size of the cache memory.

In Example 21, the memory system of any one of Examples 1 to 20 may optionally include that the one or more processors are further configured to determine a memory size of the cache memory and to generate the dummy address space with a size that matches the determined memory size of the cache memory.

In Example 22, the memory system of any one of Examples 1 to 21 may optionally include that the cache memory is a direct mapped cache memory.

In Example 23, the memory system of any one of Examples 1 to 22 may optionally include that the one or more processors are configured that the dummy address space is not accessible by a read operation from an application executed by an operating system of a computing system coupled to the memory system.

Example 24 is a computing system, including a memory system of any one of Examples 1 to 23.

In Example 25, the computing system of Example 24 may optionally further include one or more central processing units configured to access the memory of the memory system via memory addresses of the memory address space.

In Example 26, the computing system of Example 25 may optionally include that the one or more central processing units are configured to execute an operating system and/or applications, the operating system and/or the applications having access to the memory through the cache memory and having no access to addresses of the dummy address space.

In Example 27, the computing system of any one of Examples 24 to 26 may optionally include that the memory of the memory system is a main memory of the computing system and wherein the cache memory of the memory system is configured to cache data from the main memory.

Example 28 is a memory system, including: a caching logic configured to receive a read instruction to read from a memory address of a memory, determine whether or not data corresponding to the memory address to be read are stored in a cache memory associated with the memory, read the data from the cache memory in the case that it is determined that the data are stored in the cache memory, and read the data from the memory in the case that the data are not stored in the cache memory and store the data in the cache memory; and a cache invalidate logic configured to generate a dummy address space, the dummy address space addresses a memory size that is equal to a memory size of the cache memory, and provide a dummy read instruction to the cache logic to read from each address of the dummy address space, wherein the cache logic, upon reception of the dummy read operation, generates invalid cache entries referencing into the dummy address space.

In Example 29, the memory system of Example 28 may optionally include that the caching logic is further configured to flush a dirty cache entry to the memory before the dirty cache entry is replaced by one of the generated invalid cache entries.

Example 30 is a method (e.g., for operating a memory system), the method including: caching data of a first memory via a second memory associated with the first memory, the first memory having a memory address space associated therewith to allow an operating system to access the first memory; generating a dummy address space in addition to the memory address space, each address of the dummy address space is distinct from any address of the memory address space, and instructing a cache invalidate operation to invalidate all cache entries of the cache memory, the invalidate cache operation includes filling the cache memory with invalid cache entries by reading from the dummy address space, each of the invalid cache entries referencing into the dummy address space.

In various examples, the method of Example 30 may include one or more aspects described in any one of Examples 1 to 29.

Example 31 is a method (e.g., for operating a memory system), the method including: caching data of a first memory via a second memory associated with the first memory, the first memory having a memory address space associated therewith to allow an operating system to access the data stored in the first memory; generating a dummy address space in addition to the memory address space, each address of the dummy address space is distinct from any address of the memory address space, and instructing a cache flush and invalidate operation to flush dirty cache entries and invalidate all cache entries of the cache memory, the cache flush and invalidate operation includes flushing dirty cache entries out of the cache memory and filling the cache memory with invalid cache entries by reading from the dummy address space, each of the invalid cache entries referencing into the dummy address space.

In various examples, the method of Example 31 may include one or more aspects described in any one of Examples 1 to 29.

In Example 32, the method of Example 30 or 31 may optionally further include filling the cache memory with one or more valid cache entries by reading from the memory address space, each of the one or more valid cache entries referencing one or more memory addresses of the memory address space.

Example 33 is/are one or more non-transitory computer-readable media storing instructions thereon that, when executed by at least one processor of a computing device, direct the computing device to carry out one or more or all parts of the method according to any one of Examples 30 to 32.

Example 34 is a computing system, including: a memory having a memory address space associated therewith to access the memory; a cache memory assigned to the memory; one or more processors configured to access the memory via memory addresses of the memory address space, generate a dummy address space in addition to the memory address space, each address of the dummy address space being distinct from any address of the memory address space, and generate one or more invalid cache entries in the cache memory, the one or more invalid cache entries referencing one or more dummy addresses of the dummy address space.

Example 35 is a method for operating a memory system, the method including: receiving a read instruction to read from a memory address of a memory; determining whether data corresponding to the memory address to be read are stored in a cache memory associated with the memory; reading the data from the cache memory in the case that it is determined that the data are stored in the cache memory; reading the data from the memory in the case that the data are not stored in the cache memory and store the data in the cache memory; generating a dummy address space, the dummy address space addressing a memory size that is equal to a memory size of the cache memory; providing a dummy read instruction to read from each address of the dummy address space; and upon reception of the dummy read operation, generating invalid cache entries referencing into the dummy address space.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A memory management system, comprising:
cache invalidation logic configured to invalidate, based a cache invalidation event, cache entries within a cache memory by having each cache entry, of the cache entries within the cache memory, reference a respective dummy address from among dummy addresses within a dummy address space,
wherein
the cache memory is assigned to a memory,
the memory has a memory address space associated therewith to provide access the memory, and
each dummy address of the dummy addresses within the dummy address space is distinct from any address of the memory address space.

2. The memory management system of claim 1,
wherein the cache invalidation logic is implemented by firmware of a computing system, and
wherein the firmware comprises a firmware interface that can be called by an operating system of the computing system.

3. The memory management system of claim 2,
wherein the firmware is implemented by a unified extensible firmware interface (UFEI).

4. The memory management system of claim 2,
wherein the dummy address space is inaccessible to read operations from applications executed by the operating system.

5. The memory management system of claim 1,
wherein the cache invalidation event is a cache invalidation request.

6. The memory management system of claim 1,
wherein the cache invalidation event is a completion of a cryptographic erase.

7. The memory management system of claim 1,
wherein the cache invalidation logic is configured to invalidate the cache entries of the cache memory via a dummy read operation, and
wherein the dummy read operation causes each cache entry of the cache entries within the cache memory to reference said respective dummy address from among dummy addresses within the dummy address space.

8. The memory management system of claim 1,
wherein each cache entry of the cache entries comprises a respective tag,
wherein said respective tag references the dummy address space in the case that the cache entry, corresponding to said respective tag, is invalid.

9. The memory management system of claim 1,
wherein each cache entry of the cache entries comprises a respective tag,
wherein said respective tag references the memory address space in the case that the cache entry, corresponding to said respective tag, is valid.

10. The memory management system of claim 1,
wherein the cache invalidation logic is further configured to:
determine a memory size of the cache memory, and
generate the dummy address space based on the memory size of the cache memory determined by the cache invalidation logic.

11. The memory management system of claim 10,
wherein the cache invalidation logic is configured to generate the dummy address space such that a memory size of the dummy address space matches the memory size of the cache memory determined by the cache invalidation logic.

12. The memory management system of claim 10,
wherein the cache invalidation logic is configured to generate the dummy address space such that a memory size of the dummy address space is greater than the memory size of the cache memory determined by the cache invalidation logic.

13. The memory management system of claim 1, further comprising:
cache flush logic configured to change a bit-value of a dirty bit associated with each cache entry of the cache memory that is modified by a write-back operation.

14. A memory system, comprising:
a first memory and a second memory,
wherein
the first memory is configured as a direct-mapped cache for the second memory, and
the second memory has a memory address space associated therewith to provide access the second memory; and
one or more processors configured to execute cache invalidation logic to invalidate, based on a cache invalidation event, cache entries within the first memory by having each cache entry, of the cache entries within the first memory, reference a respective dummy address from among dummy addresses within a dummy address space,
wherein each dummy address of the dummy addresses within the dummy address space is distinct from any address of the memory address space.

15. The memory system of claim 14,
wherein the first memory is implemented as a dynamic random-access memory (DRAM), and
wherein the second memory is implemented as a three-dimensional (3D)) XPoint memory.

16. The memory system of claim 14,
wherein a latency for an input/output operation directed to the first memory is less than a latency for an input/output operation directed to the second memory.

17. The memory system of claim 14,
wherein the number of dummy addresses within the dummy address space is greater than or equal to the number of cache entries within the second memory.

18. The memory system of claim 14,
wherein the one or more processors are further configured to execute an operating system and/or applications,
wherein the operating system and/or the applications are configured to:
  permit access to the second memory through the first memory, and
  preclude access to the dummy addresses of the dummy address space.

19. One or more non-transitory machine-readable media storing instructions thereon, which when executed by at least one processor of a memory system, direct the memory system to:
  process an instruction to read from a memory address of a memory;
  determine whether data corresponding to the memory address to be read is stored in a cache memory associated with the memory;
  read the data from the cache memory in the case that it is determined that the data to be read is stored in the cache memory;
  read the data from the memory in the case that it is determined that the data to be read is not stored in the cache memory;
  generate a dummy address space,
    wherein the dummy address space has a memory size that is greater than or equal to a memory size of the cache memory;
  provide a dummy read instruction to read from each address of the dummy address space; and
  replace, in response to the dummy read operation, cache entries in the cache memory with invalid cache entries referencing the dummy address space.

20. The one or more non-transitory machine-readable media of claim 19, storing further instructions, which when executed by the at least one processor of the memory system, direct the memory system to:
  flush, in response to the dummy read operation, a dirty cache entry to the memory before the dirty cache entry is replaced by an invalid cache entry of the invalid cache entries.

* * * * *

UNITED STATES PATENT AND TRADEMARK OFFICE
CERTIFICATE OF CORRECTION

PATENT NO. : 11,580,029 B2
APPLICATION NO. : 17/223113
DATED : February 14, 2023
INVENTOR(S) : Andy Rudoff et al.

Page 1 of 1

It is certified that error appears in the above-identified patent and that said Letters Patent is hereby corrected as shown below:

In the Claims

Column 19, Line 5, change "(3D))" to --(3D)--

Signed and Sealed this
Twenty-fifth Day of April, 2023

Katherine Kelly Vidal
*Director of the United States Patent and Trademark Office*